Aug. 28, 1962        S. LENET        3,051,468
LEAF SPRING ATTACHMENT FOR VEHICLES
Filed Feb. 18, 1960        2 Sheets-Sheet 1
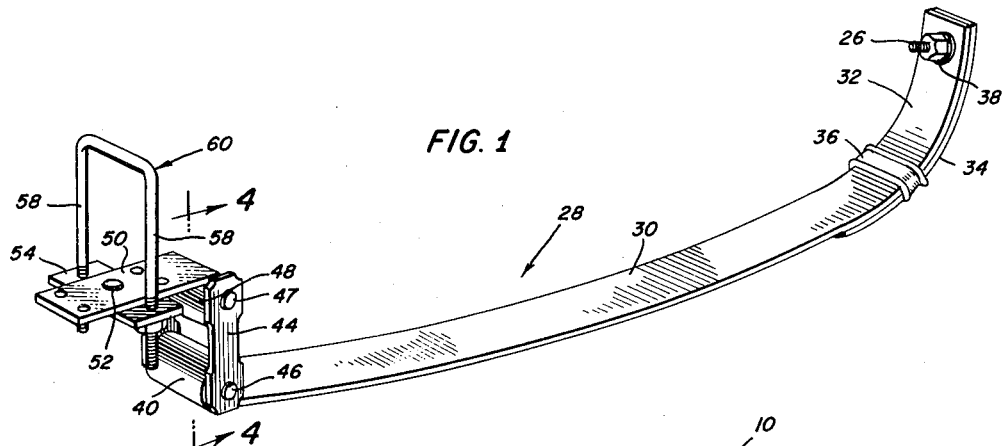
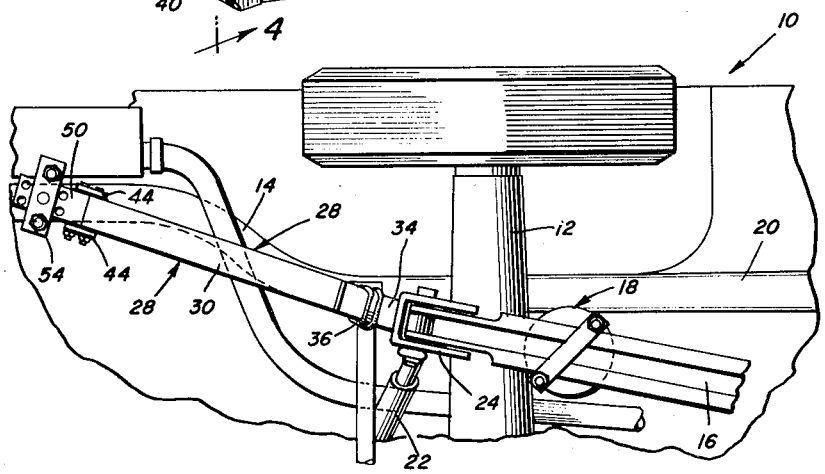
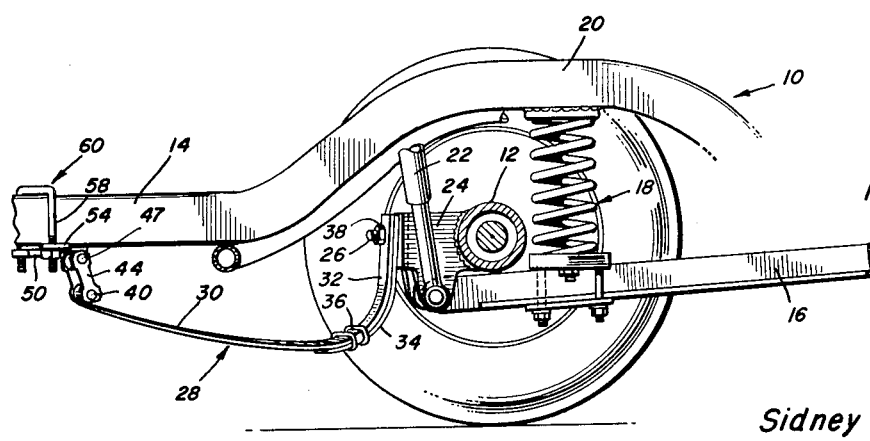
INVENTOR
Sidney Lenet
BY
ATTORNEY Aug. 28, 1962 S. LENET 3,051,468
LEAF SPRING ATTACHMENT FOR VEHICLES
Filed Feb. 18, 1960 2 Sheets-Sheet 2

INVENTOR
Sidney Lenet

BY

ATTORNEY

United States Patent Office 3,051,468
Patented Aug. 28, 1962

3,051,468
LEAF SPRING ATTACHMENT FOR VEHICLES
Sidney Lenet, 6511 Bradford Terrace, Philadelphia, Pa.
Filed Feb. 18, 1960, Ser. No. 9,469
1 Claim. (Cl. 267—16)

The present invention relates to an improved spring attachment for supplementing and improving the riding characteristics provided by a conventional rear spring installation on a vehicle.

The portion of a vehicle chassis projecting rearwardly of the rear axle of the vehicle on either truck or passenger vehicle is subject to excessive loads and forces upon striking rough road or during braking and thus it is desirable to supplement the normal springing of such vehicles.

A primary object of this invention is to provide a supplemental leaf spring attachment which is economically and readily manufactured, easily installed and which improves the riding qualities of a vehicle as well as reducing the maintenance and repair on the springs.

A further object of the invention is to provide a leaf spring attachment extendable between a rear portion of a frame member and a radius rod for supplementing the conventional spring and preventing excessive side sway.

With the above objects in view, together with such additional objects and advantages as may subsequently become apparent, the invention will be described more fully in the accompanying drawings, in which like parts are referred to by similar reference characters, wherein:

FIGURE 1 is a perspective view of the preferred embodiment of the supplemental spring of the invention;

FIGURE 2 is a bottom plan view of the spring of FIGURE 1 installed between a radius rod and frame member;

FIGURE 3 is a side elevation of the installation of FIGURE 2 with the rear wheel removed for clarity;

Figure 4:
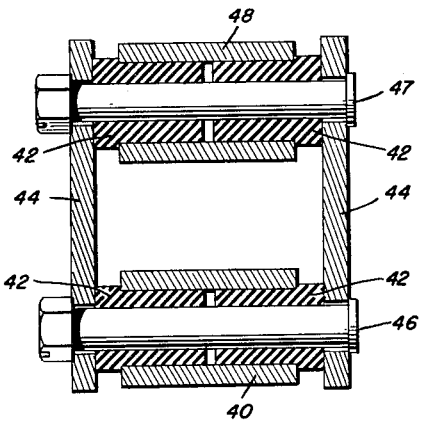
FIGURE 4 is an enlarged section taken on line 4—4 of FIGURE 1.

Referring to FIGURES 1–3, a fragmentary portion of a vehicle is indicated generally at 10, and includes a rear axle 12, frame member 14, radius rod 16, and coil spring assembly 18 interposed between the radius rod 16 and the humped up portion 20 of the frame member 14. A shock absorber 22, shown fragmentarily, is secured to the terminal end of the radius rod by means of a suitable support bracket 24.

A bolt 26 extends rearwardly from the bracket 24 and provides means whereby one end of a supplemental leaf spring assembly 28 is anchored on the vehicle chassis. The assembly 28 includes an elongated leaf spring body member 30, curved upwardly at 32, and which may include a juxtaposed supplementary leaf 34 retained thereto by a clamp 36. The portion 32 and leaf 34 are apertured to receive bolt 26 therethrough and be retained thereon by a nut 38.

The body member 30 includes at its other end a reverse bend transverse sleeve 40 having rubber sleeves 42 inserted therein, see FIGURE 4, and a pair of mounting links 44 are retained at opposite ends of the sleeves by means of a mounting bolt assembly 46. Secured between the other ends of the links 44 by means of a second bolt assembly 47 is a sleeve 48 of a mounting plate 50; there being rubber sleeves 42 also utilized in the ends of sleeve 48. The mounting plate 50 is fixedly secured by welding or a rivet 52 to a transverse plate 54 which is apertured at its ends. The apertured ends receive the legs 58 of an inverted U-bolt assembly 60 used to mount the supplemental spring assembly intermediately of the frame 14.

The spring assembly in addition to absorbing vertical components of force will also absorb lateral components of force due to their angular disposition relative to the longitudinal axis of the vehicle to reduce side sway, etc.

Figure 5:
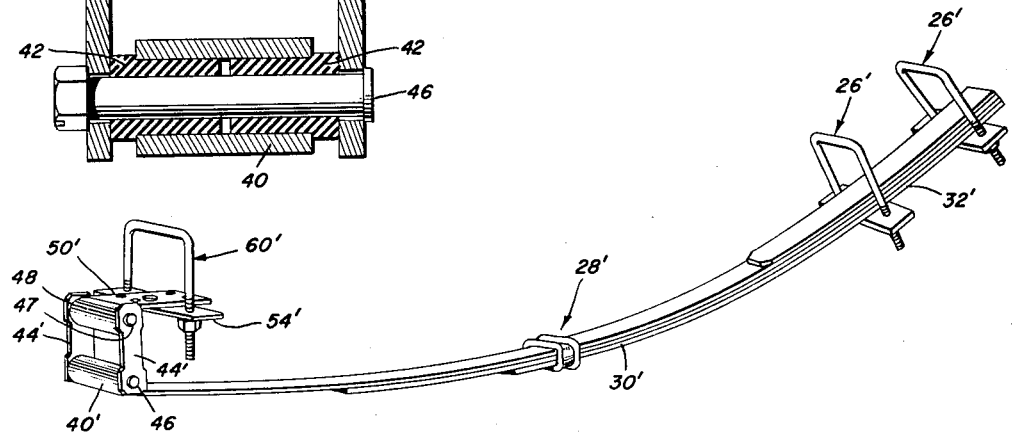
FIGURE 5 is a perspective view of another embodiment of the novel spring.
Figure 6:
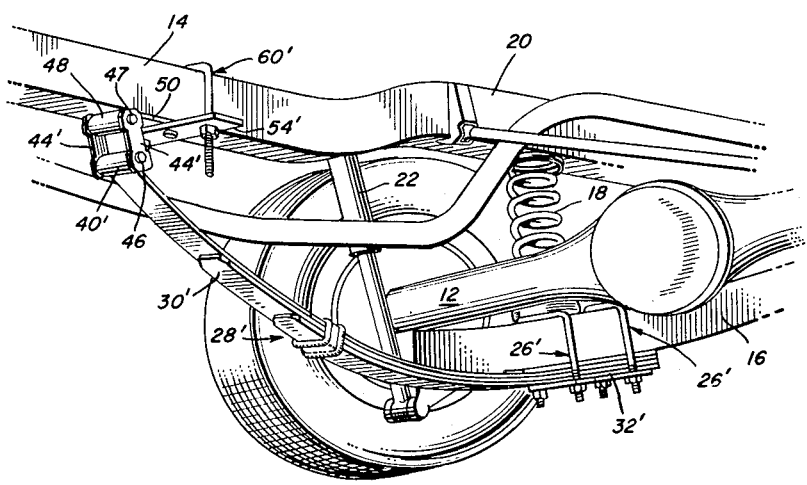
FIGURE 6 is a perspective view of an installation utilizing the spring of FIGURE 5.

Considering FIGURES 5 and 6, an installation adaptable for use of a truck is disclosed. In this installation, the supplemental spring is indicated generally at 28', and includes a plurality of juxtaposed leaves suitably secured to form an elongated body. At the end, 32' a pair of U-bolts 26' are provided which will extend over an intermediate portion of the radius rod 16 and anchor the end portion 32' therebeneath.

The other end of the body 30' terminates in a sleeve 40' mounted between links 44' in the manner shown in FIGURE 4. Secured to the upper ends of the links 44' is a mounting plate 50' secured in a transverse plate 54' which is apertured at its ends to cooperate with a U-bolt 60'.

In each embodiment it will be observed that during braking or turns where sudden vertical or lateral components of force are transmitted between the running gear and chassis, the supplemental springs will absorb and dampen such forces. The supplemental springs are especially desirable in passenger vehicles where a "continental pack" is installed and excessive loading is applied to the chassis to the rear of the rear axle, as well as in trucks where a similar loading occurs.

The supplemental installations may be readily installed with a minimum of equipment or modification.

The construction, operation and advantages of the invention are now believed to be apparent.

It will be obvious to those skilled in the art that various changes may be made without departing from the spirit of the invention and therefore the invention is not intended to be limited to what is shown in the drawings and described in the specification, but only as indicated in the appended claim.

What is claimed is:

In combination, a vehicle frame member, a torque rod extending diagonally beneath said frame member, spring means operatively extending between and resiliently coupling said torque rod and frame member, a shock absorber connected at one end to said frame member and connected at its other end to the torque rod by a bracket, a supplemental spring assembly extending angularly from said torque rod and said frame rearwardly of said spring means, said spring assembly comprising a leaf spring curved upwardly at one end and having means thereon securing said curved end against said bracket, and link means at the other end of said leaf spring with means extending therefrom securing the link means to said frame member.

References Cited in the file of this patent

UNITED STATES PATENTS

| | | |
|---|---|---|
| 1,188,685 | Serrel | June 27, 1916 |
| 1,538,955 | Schell | May 26, 1925 |
| 2,264,298 | Crabtree | Dec. 2, 1941 |
| 2,301,398 | Haynes | Nov. 10, 1942 |
| 2,372,549 | Chambers | Mar. 27, 1945 |
| 2,576,935 | Hayes | Dec. 4, 1951 |
| 2,692,778 | Stump | Oct. 26, 1954 |
| 2,701,713 | Tea | Feb. 8, 1955 |